July 31, 1956  HIDEO INUZUKA ET AL  2,757,068
PROCESS FOR EXTRACTING GERMANIUM MONOXIDE
Filed Dec. 18, 1953
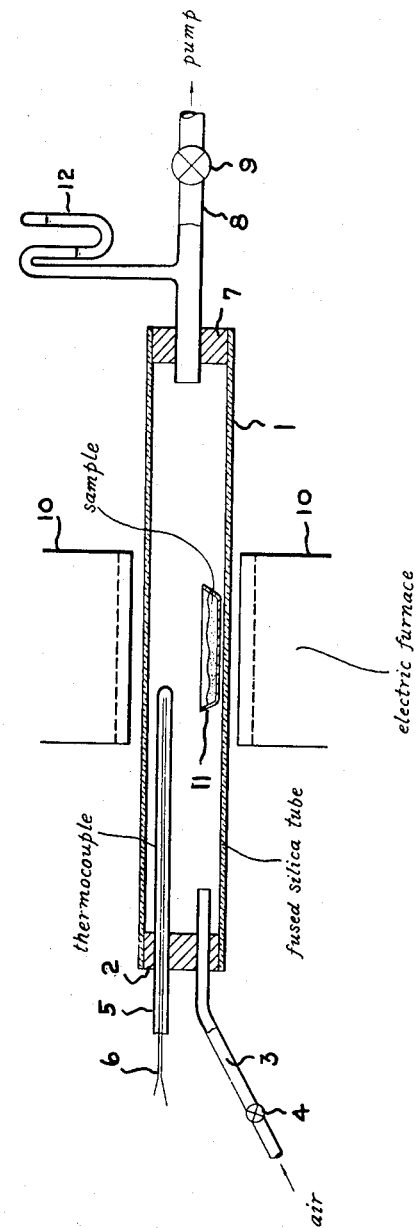
INVENTORS
HIDEO INUZUKA &
KAKUZO TADA
BY Wenderoth, Lind & Ponack
Attys.

United States Patent Office 2,757,068
Patented July 31, 1956

2,757,068

PROCESS FOR EXTRACTING GERMANIUM MONOXIDE

Hideo Inuzuka and Kakuzo Tada, Ota-ku, Tokyo, Japan, assignors to Tokyo Shibaura Electric Co., Ltd., Kawasaki-shi, Kanogawa-ken, Japan Application December 18, 1953, Serial No. 399,161

Claims priority, application Japan December 26, 1952

1 Claim. (Cl. 23—21)

This invention relates to a process for extracting germanium monoxide or, particularly, to an extracting process suitable to obtain germanium monoxide from a silicon carbide which is contaminated with metallic germanium.

The use of germanium has been developed for crystal rectifiers and transistors. The demand therefor has been remarkably increasing. It is necessary in such usages to cut or grind germanium. Thus a considerable amount of valuable germanium is lost as so-called chips. Germanium to be used for crystal rectifiers and transistors is doped with a slight amount of such elements as boron, aluminum, etc. as impurities to make the germanium of p-type and phosphorus, antimony, etc. as impurities to make the germanium of n-type. Therefore, even if germanium were recovered as it is from said chips, it could not be reused. As silicon carbide (SiC) is used as abrasive in working germanium in most cases, it is disadvantageous in operation to extract the small amount of germanium as a chloride from the ground chip powder of said silicon carbide. That is to say, according to the hitherto existing process, there is no other way than to obtain a considerably refined product by fractionally distilling germanium tetrachloride ($GeCl_4$) obtained by chlorination of germanium contained in said ground chip powder and then to subject said product to a segregation process. Germanium is chloridized usually by heating a material containing germanium in a chlorine gas flow. However, in case silicon carbide co-exists in said material, silicon tetrachloride ($SiCl_4$) will be simultaneously produced and, as the boiling point of silicon tetrachloride is lower than that of germanium tetrachloride, there will be disadvantageous inconvenience in fractional distillation.

An object of this invention is to provide a process for obtaining germanium monoxide at a good yield from a material containing metallic germanium co-existing with silicon carbide.

Other objects of the invention will be understood from the following descriptions.

There is a lower oxidized substance, that is, germanium dimonoxide (GeO) as well as non-volatile germanium dioxide ($GeO_2$) in germanium oxide. It is known that said germanium monoxide is produced by heating a mixture of equivalent amounts of germanium dioxide ($GeO_2$) and germanium (Ge) under a reduced pressure and is considerably volatile at high temperatures above 800° C. It has been found that by heating germanium at 800° C. in an oxygen atmosphere at normal pressure, germanium dioxide is produced in the main, and that only a small quantity of germanium monoxide is formed. However, it has also been found that germanium monoxide can be easily produced by heating germanium in an atmosphere at a reduced pressure of an incomplete oxidizing gas obtained by mixing such an inert gas as nitrogen with oxygen.

In recovering germanium contaminated with about 1% in the powder of silicon carbide, if the reaction temperature is chosen at 900 to 1100° C. and the pressure within the reaction vessel is chosen as reduced to 10 to 40 mm. Hg, the mixed gas to be used may be either air or a mixed gas of oxygen and nitrogen containing more oxygen than air does.

The germanium monoxide extracting apparatus used in this invention is shown diagrammatically on the accompanying sheet of drawing. The reaction vessel was a transparent fused silica tube 1 measuring 30 mm. in inside diameter, 2 mm. in wall thickness and 1 meter in length. The opening at one end of the tube was air-tightly fitted with a rubber plug 2 through which a gas inlet tube 3 provided with a cock 4 and a protecting tube 5 for thermocouple were air-tightly inserted. The opening at the other end of the tube was air-tightly fitted with a rubber plug 7 through which a gas outlet tube 8 provided with a cock 9 was air-tightly inserted. The length of about 25 cm. at the middle part of said tube 1 was made so as to be inserted into an electric furnace 10. The material powder was contained in a boat 11 made of fused silica and measuring 10 cm. in length, 2 cm. in width and 1 cm. in depth. The boat was inserted and placed in the middle part of the tube 1, being adjacent to the tip of the thermocouple. The gas outlet tube 8 was connected with a vacuum pump. A side tube with which a manometer 12 was connected was provided so as to measure the pressure within the reaction tube 1.

In each of the following illustrative examples, this invention was applied to powdered chips obtained when germanium was worked with abrasives of silicon carbide, the germanium content being more or less than 1%.

EXAMPLE 1

5 grams of a material containing germanium were put into the boat. The boat was inserted and placed in the reaction tube. First, the gas inlet tube was connected with a gas reservoir containing a mixed gas consisting of 8.5 parts by volume of nitrogen and 1.5 parts by volume of oxygen. The cock of the gas outlet tube was opened and the air within the reaction tube was replaced with said mixed gas. Said cock was then closed. Next, the gas outlet tube was connected with the vacuum pump and electric currents were fed to the electric furnace while the pressure within the tube was being reduced. When the temperature therein bcame 1000° C., the cock of the gas inlet tube was slightly opened and the mixed gas was led in. Heating was continued for 2 hours in a flow of the mixed gas while the pressure within the tube was regulated to be 2 to 3 mm. Hg by the indication of the manometer. Then the feed of the electric currents was stopped and the two cocks were closed. At this time, the temperature within the reaction tube had reached approximately 1100° C. The germanium dioxide contained in the powder reacted during the above heating. The gas containing germanium monoxide moves through the reaction tube mainly to the side of the ga outlet tube and was cooled to deposit germaniun monoxide on the inside wall of the reaction tube. Hov ever, a part of germanium monoxide was deposited on the inside wall of the reaction tube on the side of the gas inlet tube.

Total amount of the deposited germanium monoxide was determined as follows: When the reaction tube was cooled, it was taken out of the furnace. At first, a mixed solution of 20 cc. of 20% NaOH and 5 cc. of 30% $H_2O_2$ was poured into the tube by fixing the rubber plug at the opening at one end of the tube. The deposit was dissolved therein by being heated at 80 to 90° C. and $H_2O_2$ was driven out by further boiling the solution. Then, according to the method of G. R. Davies and G. Morgan (see the "Analyst" vol. 63, pages 388–397 (1938)), the solution was treated with sulphuric acid and, thereafter, a tannic acid solution. A precipitate produced was filtered, washed and then ignited and was thus weighed as germanium dioxide. As a result, the percentage of extraction was 73%.

Germanium monoxide deposited on the inside wall of the reaction tube can be obtained as germanium tetrachloride when heated at 400° C. by passing a chlorine gas flow through the tube and can therefore be easily taken out and utilized.

In order to deposit germanium monoxide, a tube through which a cooling medium is passed may be fixed within the reaction tube or formed so as to be free to insert and remove.

EXAMPLES 2 TO 4

The material was treated in the same manner as in Example 1. The conditions as different from those in Example 1 and the results are listed en bloc in Table I. The conditions and result in Example 1 are also enumerated for information.

Table I

| Examples | Mixed Gas | Reaction Temperature, °C. | Reaction Pressure, mm. Hg | Reaction Time, hours | Total amount of Inflow of Mixed Gas, liters approximately | Percentage of Extraction |
|---|---|---|---|---|---|---|
| 1 | $N_2$:8.5, $O_2$:1.5* | 1,000 to 1,100 | 2 to 3 | 2 | 1 | 73 |
| 2 | Air | 900 to 1,000 | 15 to 16 | 2 | 7 | 69 |
| 3 | Air | 900 to 1,000 | 20 to 22 | 2 | 10 | 84 |
| 4 | $N_2$:1, $O_2$:9* | 900 to 1,000 | 25 to 30 | 2 | 15 | 90 |

*Parts by volume.

What we claim is:

A process for extracting germanium as germanium monoxide from silicon carbide-containing material, which comprises heating said silicon carbide material containing metallic germanium at 900° to 1000° C. in a flow under a reduced pressure of 10 to 40 mm. Hg of a gas selected from the group consisting of air and a mixture of nitrogen and oxygen, said mixture containing more oxygen than is contained in air, and cooling the thus-produced gas containing germanium monoxide.

References Cited in the file of this patent

FOREIGN PATENTS 378,017    Great Britain _____ July 22, 1932

OTHER REFERENCES

Hopkins: "Chemistry of the Rarer Elements," 1923, published by D. C. Heath and Co., New York, pages 199 and 200.

Browing: "Introduction to the Rarer Elements," 1912, published by John Wiley and Sons, New York, page 105.